United States Patent
Kim et al.

(10) Patent No.: US 9,305,713 B2
(45) Date of Patent: Apr. 5, 2016

(54) HYBRID NANOSTRUCTURE INCLUDING GOLD NANOPARTICLES AND PHOTOELECTRODE FOR SOLAR CELL HAVING THE SAME

(71) Applicant: Ewha University—Industry Collaboration Foundation, Seoul (KR)

(72) Inventors: Dong Ha Kim, Seoul (KR); Yoon Hee Jang, Uijeongbu-si (KR)

(73) Assignee: Ewha University Industry Collaboration Foundation, Seoul (KR)

( * ) Notice: Subject to any disclaimer, the term of this patent is extended or adjusted under 35 U.S.C. 154(b) by 61 days.

(21) Appl. No.: 13/905,964

(22) Filed: May 30, 2013

(65) Prior Publication Data

US 2013/0319513 A1    Dec. 5, 2013

(30) Foreign Application Priority Data

May 30, 2012   (KR) .......................... 10-2012-0057654

(51) Int. Cl.
  *H01L 21/00*  (2006.01)
  *H01L 31/00*  (2006.01)
  *H01G 9/20*   (2006.01)
  *H01G 9/00*   (2006.01)

(52) U.S. Cl.
  CPC ........... *H01G 9/2027* (2013.01); *H01G 9/0029* (2013.01); *H01G 9/2036* (2013.01); *H01G 9/2031* (2013.01); *H01G 9/2059* (2013.01); *Y02E 10/542* (2013.01)

(58) Field of Classification Search
  USPC ............................................ 136/256; 438/98
  See application file for complete search history.

(56) References Cited

U.S. PATENT DOCUMENTS

| 4,804,686 | A  | * | 2/1989  | Regnier et al. ................. 521/28 |
| 6,538,194 | B1 | * | 3/2003  | Koyanagi et al. ............. 136/256 |
| 2010/0126563 | A1 | * | 5/2010  | Park et al. .................... 136/252 |
| 2010/0200051 | A1 | * | 8/2010  | Triani et al. .................. 136/255 |
| 2010/0243020 | A1 | * | 9/2010  | Norton et al. ................. 136/244 |
| 2010/0288356 | A1 | * | 11/2010 | Linic et al. ................... 136/256 |
| 2011/0229576 | A1 | * | 9/2011  | Trogler et al. ................ 424/490 |
| 2012/0097251 | A1 | * | 4/2012  | Takada et al. ................ 136/263 |

FOREIGN PATENT DOCUMENTS

KR   10-2012-0042825       5/2012
KR   10-2012-0114976 A    10/2012

OTHER PUBLICATIONS

Shi et al., "Tailored Core-Shell-Shell Nanostructures: Sandwiching Gold Nanoparticled between Silica Cores and Tunable Silica Shells," Langmuir, 2007, No. 23, 9455-9462.*

* cited by examiner

*Primary Examiner* — Eli Mekhlin
(74) *Attorney, Agent, or Firm* — Greer Burns & Crain Ltd.

(57) ABSTRACT

There is provided a hybrid nanostructure including Au nanoparticles, a photoelectrode for a solar cell having the hybrid nanostructure, and a solar cell including the photoelectrode.

6 Claims, 15 Drawing Sheets

| | $V_{OC}$ (V) | $J_{SC}$ (mA/cm²) | FF | PCE (η,%) |
|---|---|---|---|---|
| TiO₂ – SiO₂@TiO₂ 1.0 wt% | 0.72 | 9.30 | 0.66 | 4.39 |
| TiO₂ – SiO₂@TiO₂@Au 1.0 wt% | 0.73 | 9.64 | 0.68 | 4.78 |
| TiO₂ – SiO₂@Au@TiO₂ 1.0 wt% | 0.76 | 11.60 | 0.65 | 5.73 |

HYBRID NANOSTRUCTURE INCLUDING GOLD NANOPARTICLES AND PHOTOELECTRODE FOR SOLAR CELL HAVING THE SAME

CROSS-REFERENCE TO RELATED APPLICATION

This application claims the benefit of Korean Patent Application No. 10-2012-0057654 filed on May 30, 2012, the disclosures of which are incorporated herein by reference.

FIELD OF THE INVENTION

The present disclosure relates to a hybrid nanostructure including gold nanoparticles; a photoelectrode for a solar cell having the hybrid nanostructure; and a solar cell having the photoelectrode.

BACKGROUND OF THE INVENTION

Since a solar cell is advantageous in that it does not cause pollution, the solar cell is being reevaluated in terms of preservation of global environment. Many researches upon the solar cell as a next-generation clean energy source are being actively conducted.

As such a solar cell, there are currently known several types such as a thin film type solar cell using amorphous silicon, a chemical compound semiconductor solar cell, an organic polymer solar cell, a dye-sensitized solar cell, and so forth. Typically, a solar cell is composed of structures stacked on a base, and the solar cell includes a metal electrode and a photovoltaic conversion layer that collects light and converts the light energy into electric energy. A currently commercialized solar cell using amorphous silicon, however, has not been fully utilized due to high cost for its production and installation.

In 1990s, a dye-sensitized solar cell having low production cost and capable of replacing the amorphous silicon solar cell was reported by Grätzel group in Switzerland. Since then, various researches have been actively conducted to improve photovoltaic conversion efficiency of the dye-sensitized solar cell.

A basic principle of the operation of the dye-sensitized solar cell is as follows. If sun light is incident upon photosensitive dye molecules adsorbed on an n-type metal oxide semiconductor, electrons are excited, and the excited electrons are injected into a conduction band of metal oxide and transferred to transparent conducting oxide electrode. Then, the electrons are transferred again to a counter electrode through an external circuit, whereby electric current becomes of flow. At this time, remaining holes in a photosensitive dye molecule are reduced by an oxidation-reduction electrolyte, during which the oxidized electrolyte component becomes to be reduced by receiving electrons from the counter electrode.

Intensive research efforts have been conducted to improve the photovoltaic conversion efficiency of the solar cell. In this regard, Korean Patent Application Publication No. 2012-0042825 titled "SOLAR CELL AND METHOD FOR FABRICATING THE SAME" discloses a technique for improving efficiency of a solar cell. However, any remarkable achievement in improving efficiency of a solar cell using nanotechnology is yet to be made.

BRIEF SUMMARY OF THE INVENTION

In view of the foregoing, the present disclosure provides a photoelectrode including a hybrid nanostructure and having improved photovoltaic conversion efficiency and also provides a solar cell including the photoelectrode and a method for preparing the hybrid nanostructure.

However, the problems sought to be solved by the present disclosure are may not be limited to the above description and other problems can be clearly understood by those skilled in the art from the following description.

In accordance with a first aspect of the present disclosure, there is provided a photoelectrode for a solar cell, including hybrid nanostructure including an inorganic oxide shell formed at a support particle and Au nanoparticles.

In accordance with a second aspect of the present disclosure, there is provided a solar cell, including a photoelectrode in accordance with a first aspect of the present disclosure, a counter electrode, and an electrolyte.

In accordance with a third aspect of the present disclosure, there is provided a preparing method of a hybrid nanostructure, including forming an inorganic oxide shell at a support particle; and forming Au nanoparticles at the inorganic oxide shell.

In accordance with a fourth aspect of the present disclosure, there is provided a preparing method of a hybrid nanostructure, including forming Au nanoparticles at a support particle; and forming an inorganic oxide shell at the support particle on which the Au nanoparticles are formed.

In accordance with the present disclosure, it is possible to provide the photoelectrode for a solar cell including the inorganic oxide shell formed at the support particle and the Au nanoparticles causing a surface plasmon resonance effect. The photoelectrode for a solar cell in accordance with the present disclosure has improved photovoltaic conversion efficiency due to the surface plasmon resonance effect of the Au nanoparticles included in the photoelectrode. Further, by forming the hybrid nanostructure through the process of forming the inorganic oxide shell at the support particle, a smaller amount of in organic oxide having high price is used, so that it becomes possible to manufacture a solar cell having low cost and high efficiency. Moreover, in accordance with the present disclosure, it is possible to provide a high-efficiency solar cell including such improved photoelectrode.

In addition, in accordance with the present disclosure, it is possible to provide the hybrid nanostructure including the inorganic oxide shell formed at the support particle and the Au nanoparticles formed at the inorganic oxide shell, and it is also possible to provide the method for preparing the hybrid nanostructure including the Au nanoparticles formed at the support particle and the inorganic oxide shells formed at the Au nanoparticles. The hybrid nanostructure enables to manufacture a high-efficiency solar cell by facilitating generation of photoelectrons in a photoelectrode of a solar cell. Further, as compared to a nanostructure made of only an inorganic oxide, the hybrid nanostructure of the present disclosure can be prepared at lower cost. Furthermore, the hybrid nanostructure in accordance with the present disclosure may have wide applications to electrode material of an energy storage and converting device, design and/or synthesis of an optical device, and so forth.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Figure 1:
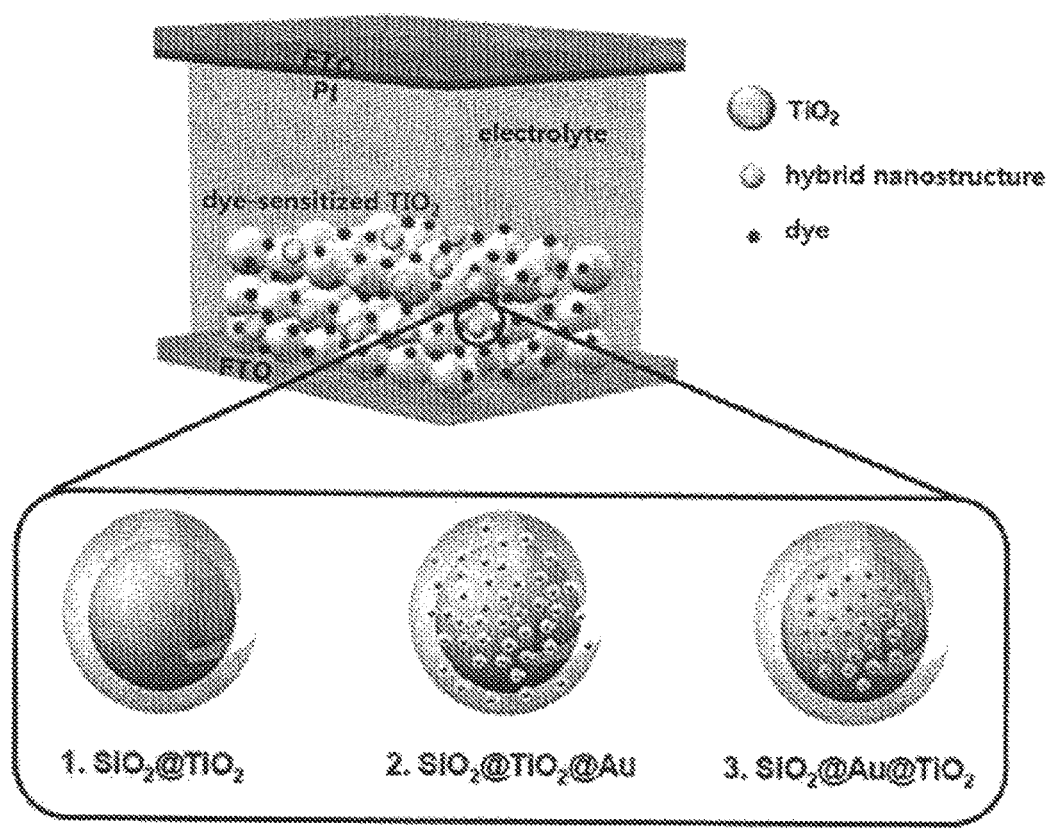
FIG. 1 is a schematic diagram illustrating a hybrid nanostructure, a photoelectrode having the hybrid nanostructure and a dye-sensitized solar cell including the photoelectrode in accordance with an illustrative embodiment of the present disclosure.

Hereinafter, illustrative embodiments and examples will be described in detail so that inventive concept may be readily implemented by those skilled in the art. However, it is to be noted that the present disclosure is may not be limited to the illustrative embodiments and examples but can be realized in various other ways. In drawings, parts not directly irrelevant to the description are omitted to enhance the clarity of the drawings, and like reference numerals denote like parts through the whole document.

Through the whole document, the terms "connected to" or "coupled to" are used to designate a connection or coupling of one element to another element and include both a case where an element is "directly connected or coupled to" another element and a case where an element is "electronically connected or coupled to" another element via still another element.

Through the whole document, the term "on" that is used to designate a position of one element with respect to another element includes both a case that the one element is adjacent to the another element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from the group consisting of components, steps, operation and/or elements described in Markush type and thereby means that the disclosure includes one or more components, steps, operations and/or elements selected from the Markush group.

Through the whole document, the term "A and/or B" means "A or B, or A and B".

Through the whole document, the term "A@B" means that B is formed on A. Further, the term "A@B@C" means that B is formed on A and, at the same time, C is formed on B.

Hereinafter, illustrative embodiments and examples will be described in detail with reference to the accompanying drawings.

In accordance with a first aspect of the present disclosure, there is provided a photoelectrode for a solar cell having a hybrid nanostructure which includes an inorganic oxide shell formed at a support particle; and Au nanoparticles.

FIG. 1 is a schematic diagram illustrating a photoelectrode for a solar cell having a hybrid nanostructure in accordance with an illustrative embodiment of the present disclosure and a solar cell having the photoelectrode. Referring to FIG. 1, the hybrid nanostructure is included in the photoelectrode of the solar cell along with a dye and $TiO_2$ so that photovoltaic conversion efficiency and cost efficiency of the photoelectrode may be improved, but may not be limited thereto.

By way of non-limiting example, the hybrid nanostructure may incur surface plasmon resonance at the photoelectrode, but may not be limited thereto. Here, the term "surface plasmon resonance" refers to a resonance phenomenon that when light, which has a certain wavelength depending on the kind and the particle size of a metal, is irradiated, the light becomes to have enhanced amplitude as compared to its amplitude at the time of light incidence due to collective oscillation of conductive band electrons within nanoparticles of the metal. That is, the surface plasmon resonance is to amplify the light of the certain wavelength by using resonance between the nanoparticles of the metal and the light irradiated thereto. The intensity of the light amplified by the surface plasmon resonance tends to decrease sharply as its travel distance increases. Accordingly, when appropriate light is irradiated to small metal particles, the intensity of the light may increase only in the vicinity of the metal particles. By way of example, using the characteristic of the light that the intensity of the light to be enhanced may change depending on the direction of polarization of the light, the intensity of the light may be controlled to be increased in a certain direction, but may not be limited thereto.

For example, the wavelength range of sunlight which a solar cell uses is very limited. However, light in an unabsorbable wavelength range may be amplified by using the surface plasmon resonance and converted to electricity by a photoelectrode of the solar cell.

By way of non-limiting example, the photoelectrode may be implemented by, but may not be limited to, a transparent electrode. The transparent electrode may include, but may not be limited to, ITO (Indium Tin Oxide), FTO (Fluorine-doped Tin Oxide), graphene or carbon nanotube (CNT).

By way of non-limiting example, the hybrid nanostructure may be included in a titanium dioxide ($TiO_2$) paste or a zinc oxide (ZnO) paste included in the photoelectrode, but may not be limited thereto.

By way of example, the hybrid nanostructure may not only include a high-price inorganic oxide but also has therein relatively low-priced support particles. Thus, since prepared by using a relatively small amount of high-price inorganic oxide, the hybrid nanostructure may be prepared at low cost, but may not be limited thereto.

By way of example, the solar cell may be, but may not be limited to, a crystalline silicon solar cell, an amorphous silicon solar cell, a compound-based solar cell, an organic polymer solar cell or a dye-sensitized solar cell. For example, the solar cell may be a dye-sensitized solar cell, and as the surface plasmon resonance of the hybrid nanostructure occurs by hybrid nanostructure and a great amount of electrons are generated from the dye included in the photoelectrode of the solar cell, photovoltaic conversion efficiency of the solar cell may be improved, but may not be limited thereto.

In accordance with an illustrative embodiment, the Au nanoparticles may be formed at the inorganic oxide shell, but may not be limited thereto. By way of example, the Au nanoparticles may be formed at an outer surface of the inorganic oxide shell, but may not be limited thereto. As the Au nanoparticles are formed at the inorganic oxide shell, improved surface plasmon resonance may occur. By way of example, the size of each Au nanoparticle may be in the range of, e.g., about 5 nm to about 30 nm, but may not be limited thereto. By way of non-limiting example, the size of the Au nanoparticle may be in the range of, e.g., about 5 nm to about 20 nm, about 5 nm to about 10 nm, about 10 nm to about 30 nm, about 20 nm to about 30 nm or about 10 nm to about 20 nm, but may not be limited thereto.

In accordance with an illustrative embodiment, the Au nanoparticles may be formed at the support particle, but may not be limited thereto. For example, the Au nanoparticles may be formed between the support particle and the inorganic oxide shell, but may not be limited thereto. When the Au nanoparticles are formed between the support particle and the inorganic oxide shell, the Au nanoparticles may exist more stably for the external environment.

In accordance with an illustrative embodiment, the inorganic oxide may include one selected from the group consisting of $TiO_2$, ZnO, $Fe_2O_3$, $Al_2O_3$, $ZrO_2$, $Ta_2O_5$, MgO, BeO and their combinations, but may not be limited thereto. By way of example, the inorganic oxide may be used as a cathode material that receives electrons that are excited from the dye at the photoelectrode by the sunlight, but may not be limited thereto.

In accordance with an illustrative embodiment, the support particle may include $SiO_2$, $TiO_2$ or polystyrene, but may not be limited thereto.

In accordance with an illustrative embodiment, the hybrid nanostructure may be included in the photoelectrode at a ratio ranging from, but may not be limited to, about 0.1 wt % to about 10 wt %. By way of non-limiting example, the hybrid nanostructure may be included in the photoelectrode at a ratio in the range of, e.g., about 0.1 wt % to about 10 wt %, about 0.1 wt % to about 5 wt %, about 0.1 wt % to about 3 wt %, about 0.1 wt % to about 1 wt %, about 0.1 wt % to about 0.5 wt %, about 0.5 wt % to about 10 wt %, about 1 wt % to about 10 wt %, about 3 wt % to about 10 wt %, about 5 wt % to about 10 wt % or about 0.5 wt % to about 3 wt %, but may not be limited thereto.

In accordance with an illustrative embodiment, the hybrid nanostructure may have a diameter ranging from, but may not be limited to, about 100 nm to about 400 nm. By way of non-limiting example, the diameter of the hybrid nanostructure may be in the range of, e.g., about 100 nm to about 400 nm, about 100 nm to about 300 nm, about 100 nm to about 200 nm, about 200 nm to about 400 nm, about 300 nm to about 400 nm or about 200 nm to about 300 nm, but may not be limited thereto.

In accordance with an illustrative embodiment, the photovoltaic conversion efficiency of the solar cell may be improved as a result of the surface plasmon resonance phenomenon of the Au nanoparticles, but may not be limited thereto.

In accordance with a second aspect of the present disclosure, there is provided a solar cell including a photoelectrode in accordance with the first aspect of the present disclosure as described above; a counter electrode; and an electrolyte. By way of non-limiting example, the solar cell may be, but may not be limited to, a crystalline silicon solar cell, an amorphous silicon solar cell, a compound-based solar cell, an organic polymer solar cell or a dye-sensitized solar cell. By way of example, the photoelectrode may be a transparent electrode, and the transparent electrode may include, but may not be limited to, ITO (Indium Tin Oxide), FTO (Fluorine-doped Tin Oxide), graphene or carbon nanotube (CNT). By way of example, the counter electrode may be a transparent electrode, and the transparent electrode may include, but may not be limited to, ITO (Indium Tin Oxide), FTO (Fluorine-doped Tin Oxide), graphene or carbon nanotube (CNT). By way of example, the counter electrode may include platinum or carbon, but may not be limited thereto.

In accordance with a third aspect of the present disclosure, there is provided a hybrid nanostructure manufacturing method including forming an inorganic oxide shell at a support particle and forming Au nanoparticles at the inorganic oxide shell.

By way of example, the support particle may include $SiO_2$, and the inorganic oxide shell may include $TiO_2$, but may not be limited thereto. By way of example, the Au nanoparticles may have a diameter ranging from, but may not be limited to, about 5 nm to about 30 nm. By way of example, the diameter of the Au nanoparticles may be in the range of, e.g., about 5 nm to about 20 nm, about 5 nm to about 10 nm, about 10 nm to about 30 nm, about 20 nm to about 30 nm or about 10 nm to about 20 nm, but may not be limited thereto.

By way of example, the support particle may be acquired through forming a $SiO_2$ particle from a silica precursor, but may not be limited thereto. For example, the silica precursor may be TEOS (Tetraethylorthosilicate), sodium silicate or silicon tetrachloride ($SiCl_4$), but may not be limited thereto.

By way of example, the forming of the inorganic oxide shell at the support particle may include forming the inorganic oxide shell by using a linker molecule formed at the support particle, but may not be limited thereto. By way of example, the linker molecule may facilitate the formation of the inorganic oxide shell by forming an amine group at the support particle, but may not be limited thereto. For example, the linker molecule may be any of various aminosilane compounds such as (3-aminopropyl)trimethoxysilane (APTMS) and (3-aminopropyl)triethoxysilane (APTES), but may not be limited thereto.

By way of example, the forming of the inorganic oxide shell at the support particle may include forming the inorganic oxide shell from a precursor of an inorganic oxide, but may not be limited thereto. By way of example, when the inorganic oxide is $TiO_2$, the precursor may be, but may not be limited to, titanium tetraisopropoxide (TTIP), tetrabuthylorthotitanate (TBOT) or titanium tetrachloride ($TiCl_4$).

By way of example, the forming of the Au nanoparticles at the inorganic oxide shell may include forming the inorganic oxide shell by using the linker molecule formed at the inorganic oxide shell, but may not be limited thereto. By way of example, the linker molecule may serve to allow an amine group to be formed at the inorganic oxide shell and thus facilitates the formation of the Au nanoparticles, but may not be limited thereto. By way of example, the linker molecule may be any of various aminosilane compounds such as (3-aminopropyl)trimethoxysilane (APTMS) and (3-aminopropyl)triethoxysilane (APTES), but may not be limited thereto.

By way of example, the forming of the Au nanoparticles at the inorganic oxide shell may include mixing the Au nanoparticles and the inorganic oxide shell formed at the support particle, but may not be limited thereto.

In accordance with an illustrative embodiment of the present disclosure, the forming of the inorganic oxide shell at the support particle may include forming an amine group at the surface of the support particle and forming the inorganic oxide shell at the amine group, but may not be limited thereto. Further, in accordance with an illustrative embodiment of the present disclosure, the forming of the Au nanoparticles at the inorganic oxide shell may include forming an amine group at the surface of the inorganic oxide shell and forming the Au nanoparticles at the amine group. By way of example, the amine group may be formed by performing (3-aminopropyl)trimethoxysilane (APTMS) treatment on the support particle, but may not be limited thereto.

By way of example, the APTMS may be a linker molecule that is capable of forming an amine group at the surface of a substance and coupling a desired substance to the amine group by allowing the desired substance to react with the amine group. For example, the APTMS may form an amine group linked to the surface of the support particle or at the surface of the inorganic oxide shell, and may serve to link the inorganic oxide shell to the amine group linked to the support particle or may link the Au nanoparticles on the amine group linked to the inorganic oxide shell.

In accordance with an illustrative embodiment of the present disclosure, the inorganic oxide may include one selected from the group consisting of $TiO_2$, ZnO, $Fe_2O_3$, $Al_2O_3$, $ZrO_2$, $Ta_2O_5$, MgO, BeO and their combinations.

In accordance with a fourth aspect of the present disclosure, there is provided a hybrid nanostructure manufacturing method including forming Au nanoparticles at a support particle and forming an inorganic oxide shell at the support particle at which the Au nanoparticles are formed.

By way of example, the support particle may include $SiO_2$ and the inorganic oxide shell may include $TiO_2$, but may not be limited thereto. By way of example, the Au nanoparticles may have a diameter ranging from, but may not be limited to, about 5 nm to about 30 nm. By way of example, the diameter of the Au nanoparticles may be in the range of, e.g., about 5 nm to about 20 nm, about 5 nm to about 10 nm, about 10 nm to about 30 nm, about 20 nm to about 30 nm or about 10 nm to about 20 nm, but may not be limited thereto.

By way of example, the support particle may be acquired through forming a $SiO_2$ particle from a silica precursor, but may not be limited thereto. For example, the silica precursor may be TEOS (Tetraethylorthosilicate), sodium silicate or silicon tetrachloride ($SiCl_4$), but may not be limited thereto.

By way of example, the forming of the Au nanoparticles at the support particle may include forming an Au nanoparticles by using a linker molecule formed at the support particle, but may not be limited thereto. By way of example, the linker molecule may facilitate the formation of the Au nanoparticles by forming an amine group at the support particle, but may not be limited thereto. For example, the linker molecule may be any of various aminosilane compounds such as (3-aminopropyl)trimethoxysilane (APTMS) and (3-aminopropyl)triethoxysilane (APTES), but may not be limited thereto.

By way of example, the forming of the Au nanoparticles at the support particle may include mixing the support particle and the Au nanoparticles, but may not be limited thereto.

By way of example, the forming of an inorganic oxide shell at the Au nanoparticles may include forming the inorganic oxide shell by using a linker molecule formed at the Au nanoparticles, but may not be limited thereto. By way of example, the linker molecule may facilitate the formation of the inorganic oxide shell by forming an amine group at the Au nanoparticles, but may not be limited thereto. For example, the linker molecule may be any of various aminosilane compounds such as (3-aminopropyl)trimethoxysilane (APTMS) and (3-aminopropyl)triethoxysilane (APTES), but may not be limited thereto.

By way of example, the forming of the inorganic oxide shell at the Au nanoparticles may include forming the inorganic oxide shell from a precursor of an inorganic oxide, but may not be limited thereto. By way of example, when the inorganic oxide is $TiO_2$, the precursor may be, but may not be limited to, titanium tetraisopropoxide (TTIP), tetrabuthylorthotitanate (TBOT) or titanium tetrachloride ($TiCl_4$).

In accordance with an illustrative embodiment of the present disclosure, the forming of the Au nanoparticles at the support particle may include forming an amine group at the surface of the support particle and forming the Au nanoparticles at the amine group, but may not be limited thereto. Further, in accordance with an illustrative embodiment of the present disclosure, the forming of the inorganic oxide shell at the support particle having the Au nanoparticles formed thereat may include forming an amine group at the support particle having the Au nanoparticles formed thereat and at the Au nanoparticles, and forming the inorganic oxide shell at the amine group, but may not be limited thereto. By way of example, the amine group may be formed by performing (3-aminopropyl)trimethoxysilane (APTMS) treatment on the support particle, but may not be limited thereto. By way of example, the APTMS may be a linker molecule that is capable of forming an amine group at the surface of a substance and coupling a desired substance to the amine group by allowing the desired substance to react with the amine group. For example, the APTMS may form an amine group linked to the surface of the support particle or linked to the support particle at which the Au nanoparticles are formed and the Au nanoparticles, and may serve to link the Au nanoparticles to the amine group linked to the support particle or may link the inorganic oxide shell on the amine group linked to the support particle at which the Au nanoparticles are formed and the Au nanoparticles, but may not be limited thereto.

In accordance with an illustrative embodiment of the present disclosure, the inorganic oxide may include one selected from the group consisting of $TiO_2$, ZnO, $Fe_2O_3$, $Al_2O_3$, $ZrO_2$, $Ta_2O_5$, MgO, BeO and their combinations, but may not be limited thereto.

Hereinafter, examples of the illustrative embodiment will be described. However, it should be noted that the following examples are intended to facilitate understanding of the present disclosure and therefore are not intended to limit its scope.

EXAMPLE

Synthesis of Au Nanoparticles

In the present example, about 148.5 ml of distilled water and about 1.5 ml of chloroauric acid ($HAuCl_4$, 10 mg/ml) were mixed and boiled from a room temperature to about 130° C. Then, about 0.9 ml of sodium citrate (50 mg/ml) was added to the mixture solution heated to about 130° C. to thereby allow them to react with each other for about 20 minutes. During the reaction, the temperature of the mixture solution was maintained at about 120° C. to about 130° C. The sodium citrate served as a reducing agent. As the reaction proceeds, Au nanoparticles were synthesized and the color of the mixture solution became reddish orange. The size of the synthesized Au nanoparticles was measured to be about 15 nm.

Preparation of $SiO_2$ Support Particle

About 5.6 ml of TEOS (Tetraethylorthosilicate, 98%) as a silica precursor, about 10.8 ml of distilled water, about 73.8 ml (about 94%) of ethanol and about 9.8 ml of ammonia water ($NH_4OH$, 25% to 28%) were mixed and agitated for about hours, whereby $SiO_2$ support particles having a size ranging from, about 200 nm to about 400 nm were prepared.

Preparation of $SiO_2$@$TiO_2$ Hybrid Nanostructure

In order to perform APTMS treatment on the surface of the $SiO_2$ support particles prepared by the above-stated $SiO_2$ support particle preparation method, about 100 g of APTMS (97%) was added and refluxed for about 4 hours.

Figure 2:
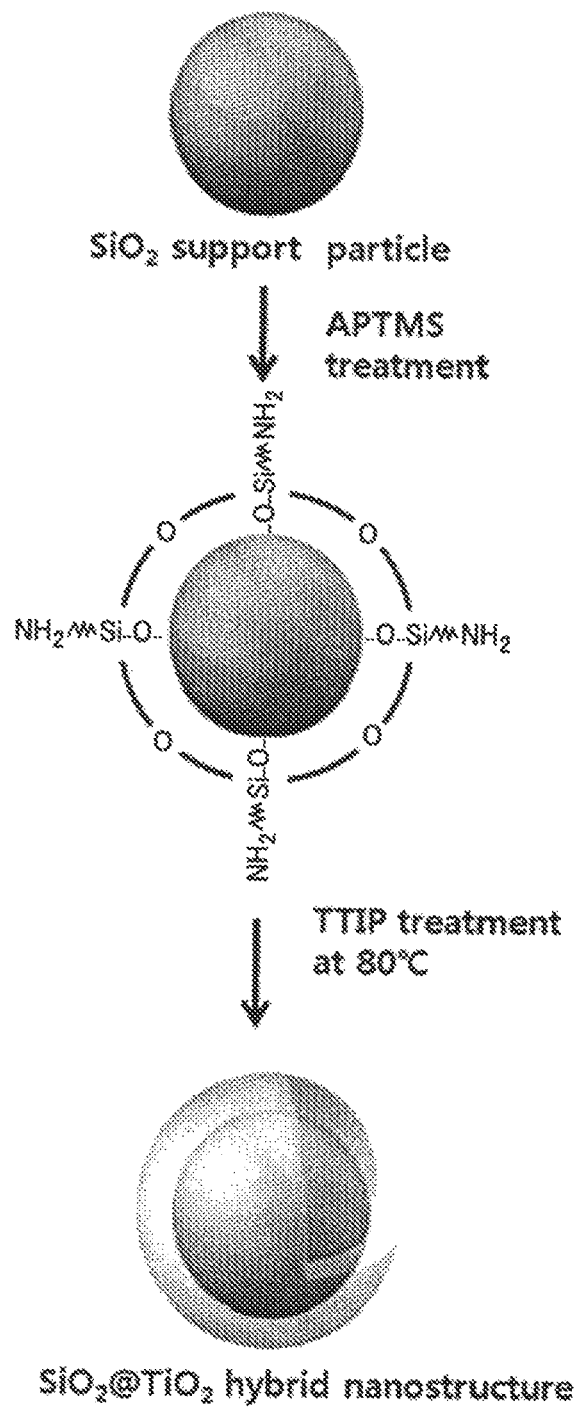
FIG. 2 is a schematic diagram illustrating a manufacturing process of a hybrid nanostructure in accordance with an example of the present disclosure.
Figure 5:
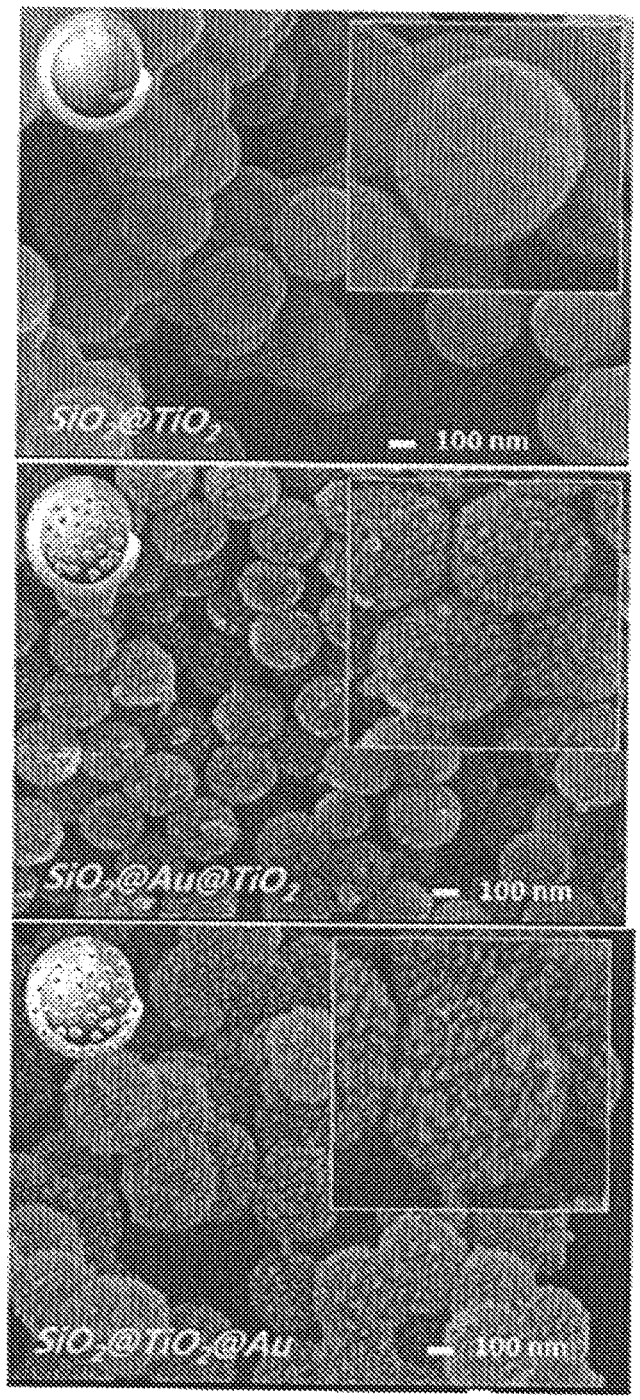
FIG. 5 shows scanning electron microscope images of hybrid nanostructures in accordance with an example of the present disclosure.
Figure 6:
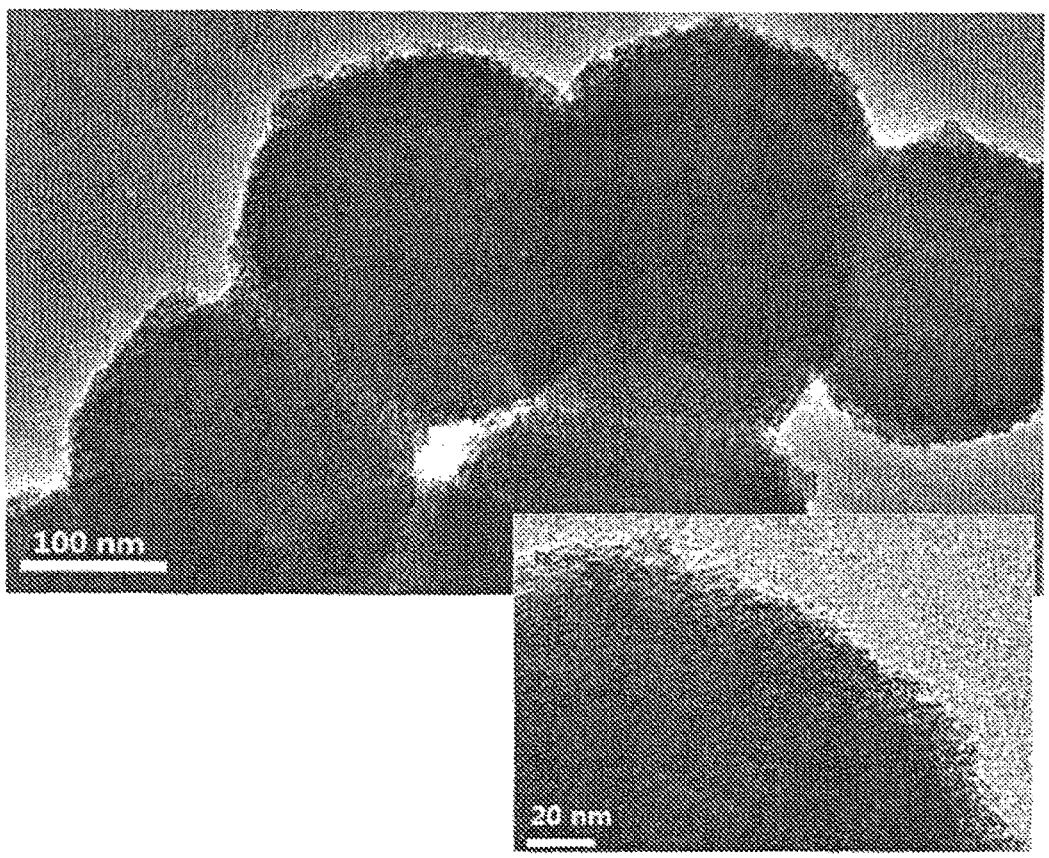
FIG. 6 is a transmission electron microscope image of a hybrid nanostructure in accordance with an example of the present disclosure.

About 25 mg of $SiO_2$ support particles which were APTMS-treated by the above-described process was dispersed in about 25 ml of ethanol, and TTIP (titanium tetraisopropoxide, 0.01 v/v %, 7.5 ml) as a precursor of $TiO_2$ was added thereto. Then, the mixture was agitated for about 30 minutes and then refluxed at about 80° C., whereby $SiO_2$@$TiO_2$ hybrid nanostructure as a comparative example was prepared. FIG. 2 presents a schematic diagram for illustrating the preparation process of the $SiO_2$@$TiO_2$ hybrid nanostructure. Further, an uppermost image of FIG. 5 is a scanning electron microscope (SEM) image of the $SiO_2$@$TiO_2$ hybrid nanostructure prepared by the method of the present example, and FIG. 6 is a transmission electron microscope (TEM) image of the $SiO_2$@$TiO_2$ hybrid nanostructure prepared by the method of the present example. As can be seen from the uppermost SEM image of FIG. 5 and the TEM image of FIG. 6, the $SiO_2$@$TiO_2$ hybrid nanostructure synthesized in accordance with the present example was found to maintain a sphere shape conforming to the shape of the $SiO_2$ support. Further, in view of the observation that the surface of the $SiO_2$ support was roughened, it could be confirmed that a $TiO_2$ shell was formed. Further, the $TiO_2$ shell thus formed was found to have a thickness in the range from about 10 nm to about 15 nm. In addition, since no particular lattice pattern could be observed from the TEM image of FIG. 6, it could be confirmed that the formed $TiO_2$ shell was amorphous.

Preparation of $SiO_2$@Au@$TiO_2$ Hybrid Nanostructure

In order to perform APTMS treatment on the surface of the $SiO_2$ support particles prepared by the above-stated $SiO_2$ support particle preparation method, about 100 μl of APTMS (97%) was added and refluxed for about 4 hours.

About 25 mg of $SiO_2$ support particles which were APTMS-treated by the above-described process was mixed with about 150 ml of Au nanoparticle solution prepared by the above-described process of synthesis of the Au nanoparticles. Then, the mixture was agitated for about 4 hours or more and dried, whereby a $SiO_2$@Au structure was prepared.

Then, in order to perform APTMS treatment on the $SiO_2$@Au structure, the 25 mg of $SiO_2$@Au structure was dispersed in about 25 ml of ethanol, and about 10 g of APTMS (97%) was added thereto. Then, the mixture was stirred for about 1 hour.

Figure 3:
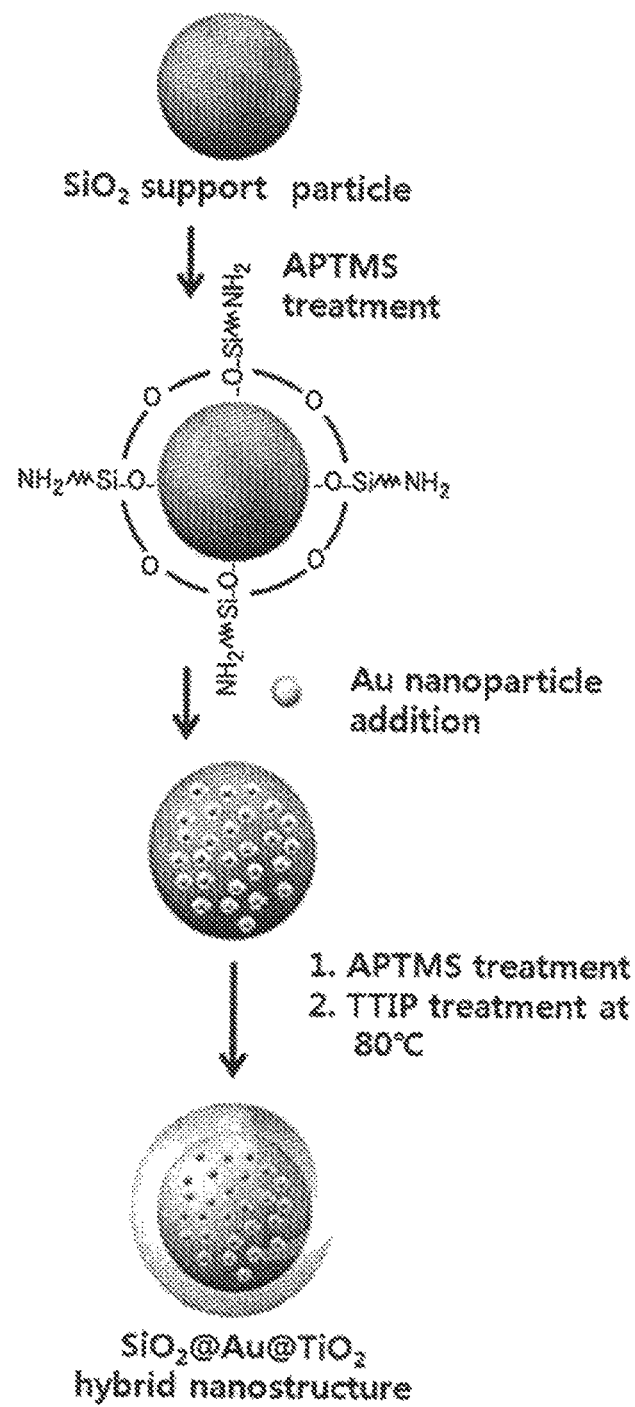
FIG. 3 is a schematic diagram illustrating a manufacturing process of a hybrid nanostructure in accordance with an illustrative embodiment of the present disclosure.
Figure 8:
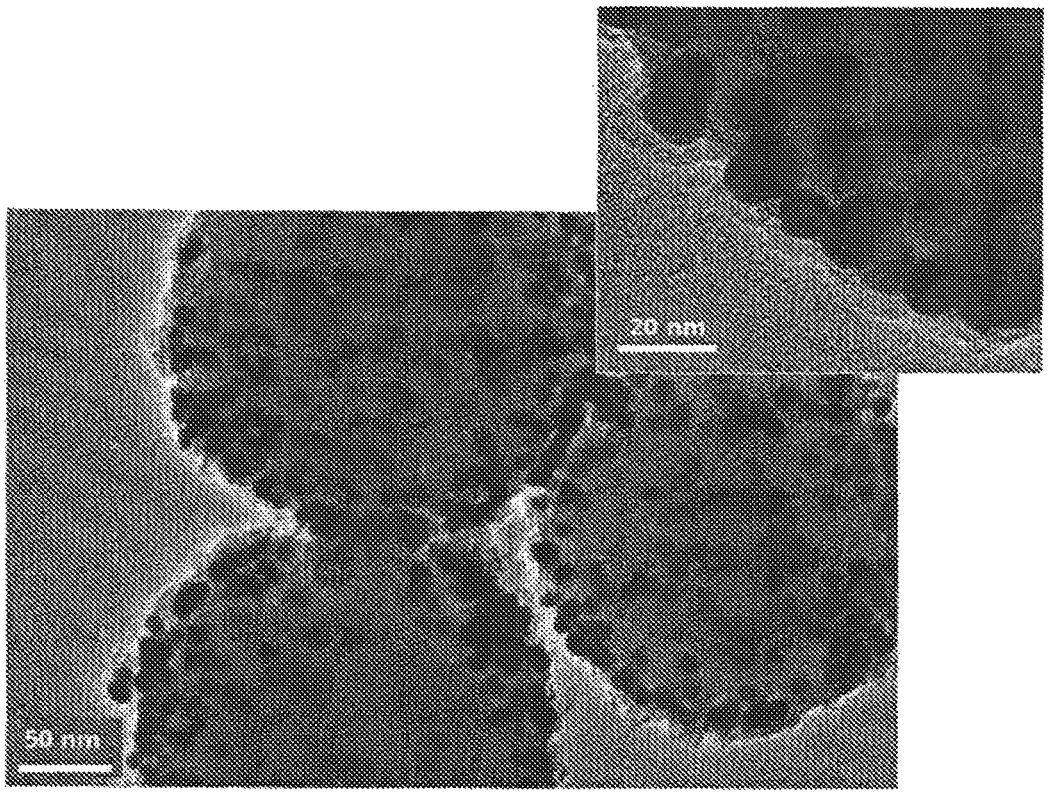
FIG. 8 is a transmission electron microscope image of a hybrid nanostructure in accordance with an example of the present disclosure.

After the $SiO_2$@Au structure was APTMS-treated through the above process, TTIP (titanium tetraisopropoxide, 0.01 v/v %, 7.5 ml) as a precursor of $TiO_2$ was added thereto. Then, the mixture was stirred for about 30 minutes and refluxed at about 80° C., whereby $SiO_2$@Au@$TiO_2$ hybrid nanostructure was prepared. A $TiO_2$ shell formed at the surface of the $SiO_2$ support particle having a spherical shape had a thickness ranging from about 10 nm to about 15 nm. FIG. 3 presents a schematic diagram for illustrating a preparation process of the $SiO_2$@Au@$TiO_2$ hybrid nanostructure. Further, an image in the middle of FIG. 5 is a scanning electron micrograph (SEM) image of the $SiO_2$@Au@$TiO_2$ hybrid nanostructure synthesized by the method of the present example, and FIG. 8 is a transmission electron micrograph (TEM) image of the $SiO_2$@Au@$TiO_2$ hybrid nanostructure prepared by the method of the present example. As can be seen from these images, it was observed that $TiO_2$ shells were formed at the outer surfaces of the Au nanoparticles adhering to the support particle.

Preparation of $SiO_2$@$TiO_2$@Au Hybrid Nanostructure

In order to perform APTMS treatment on the surface of the $SiO_2$@$TiO_2$ hybrid nanostructure prepared by the above-stated $SiO_2$@$TiO_2$ hybrid nanostructure preparation method, about 40 mg of $SiO_2$@$TiO_2$ hybrid nanostructure was dispersed in about 40 ml of ethanol, and about 16 μl of APTMS was added thereto. Then, the mixture was agitated for about 1 hour and dried.

Figure 4:
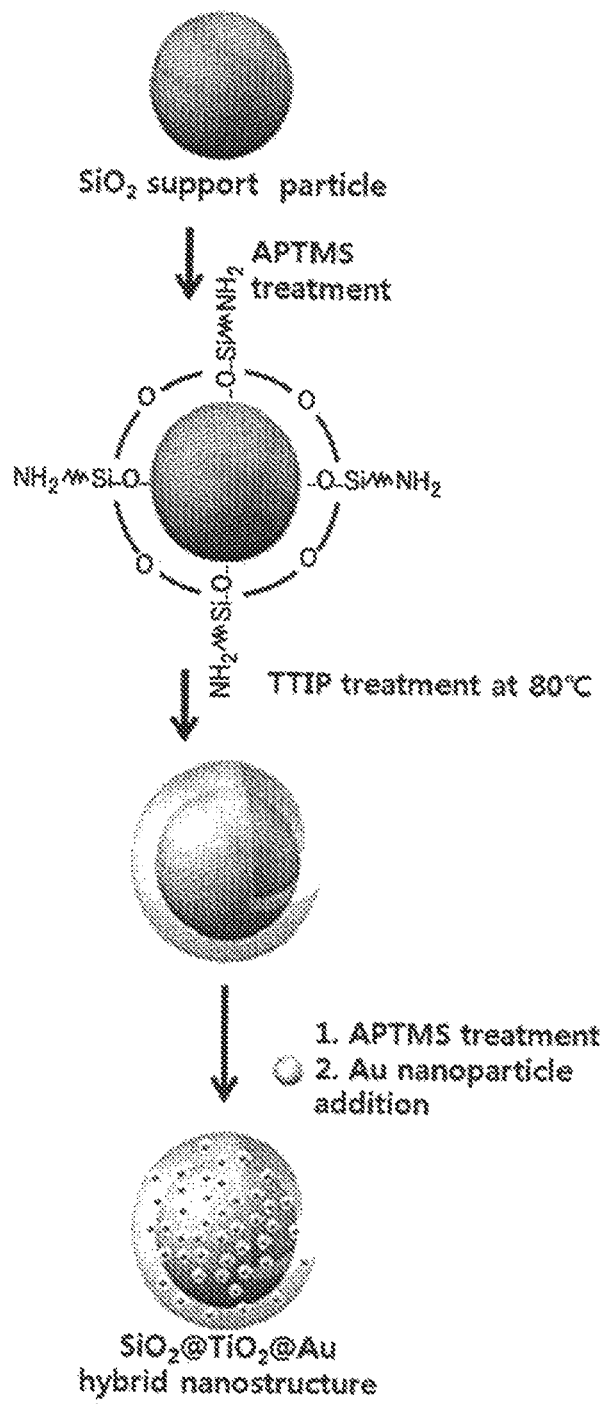
FIG. 4 is a schematic diagram illustrating a manufacturing process of a hybrid nanostructure in accordance with an illustrative embodiment of the present disclosure.
Figure 7:
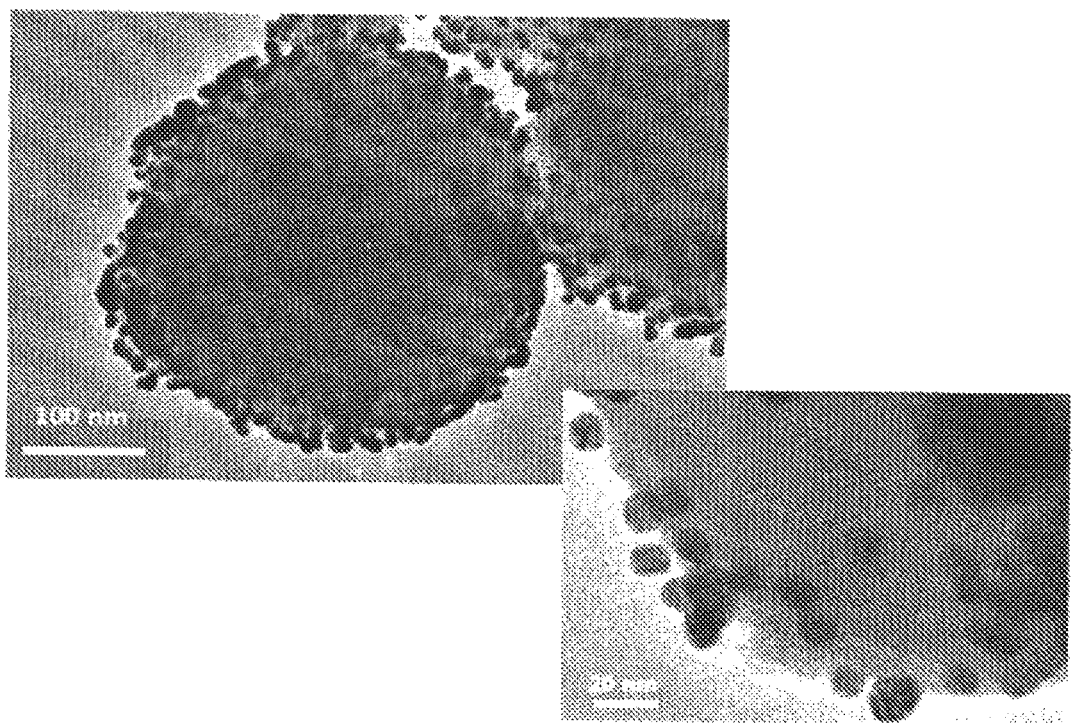
FIG. 7 is a transmission electron microscope image of a hybrid nanostructure in accordance with an example of the present disclosure.

After the $SiO_2$@$TiO_2$ hybrid nanostructure was APTMS-treated, about 25 mg of such $SiO_2$@$TiO_2$ hybrid nanostructure was mixed with about 150 ml of Au nanoparticle solution prepared by the above-stated process of synthesis of Au nanoparticles, whereby a $SiO_2$@$TiO_2$@Au hybrid nanostructure was prepared. FIG. 4 presents a schematic diagram for illustrating the preparation process of the $SiO_2$@$TiO_2$@Au hybrid nanostructure. Further, a bottommost image of FIG. 5 is a scanning electron microscope (SEM) image of the $SiO_2$@$TiO_2$@Au hybrid nanostructure prepared by the method of the present example, and FIG. 7 is a transmission electron microscope (TEM) image of the $SiO_2$@$TiO_2$@Au hybrid nanostructure prepared by the method of the present example. As can be seen from these images, a $TiO_2$ shell having a thickness in the range from about 10 nm to about 15 nm was found to be formed on a spherical support particle, and an Au nanoparticles adhering to the outer surface of the $TiO_2$ shell were observed.

Manufacture of Dye-Sensitized Solar Cell

P25 $TiO_2$, polyethylene glycol and polyethylene oxide at a ratio of about 10:9:1 were dissolved in ethanol and distilled water (1:1), and a $SiO_2$@$TiO_2$, a $SiO_2$@Au@$TiO_2$ or a $SiO_2$@$TiO_2$@Au hybrid nanostructure was mixed thereto at a ratio of about 0.1% to about 10%. Then, the mixture was stirred for 24 hours or more, whereby titanium dioxide paste was prepared. The polyethylene glycol and the polyethylene oxide were used to improve viscosity of the paste, and the ethanol and the distilled water were used as a solvent.

A thin film was formed on a FTO transparent electrode by a doctor blade method using the paste, and heat treatment was performed at about 125° C., about 320° C., about 370° C., about 450° C., and about 500° C., sequentially. Thereafter, after performing $TiCl_4$ and oxygen plasma processing on the thin film, the thin film was immersed in a dye solution for about 24 hours, whereby a dye is adsorbed to the thin film. Then, a unit cell was manufactured, and a current density-voltage curve was measured.

Analysis of Characteristics of Hybrid Nanostructure-Measurement of Absorbance

Figure 9:
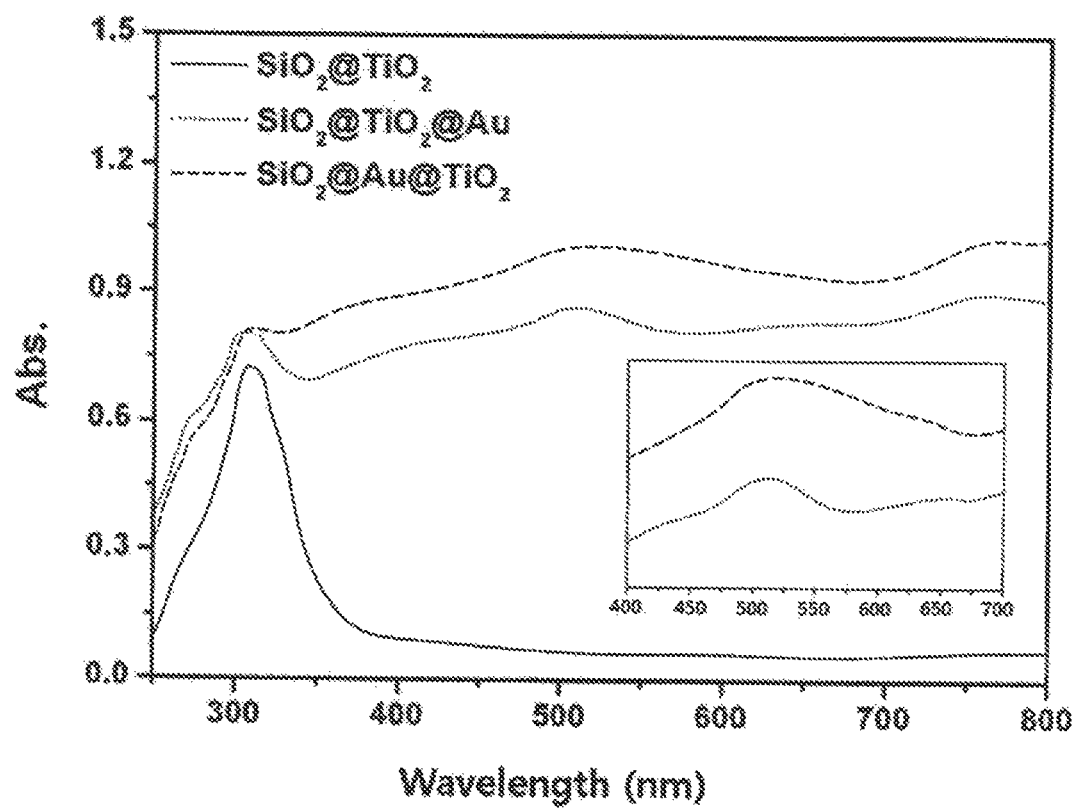
FIG. 9 is a graph of UV-VIS absorption spectra in accordance with an example of the present disclosure.
Figure 10:
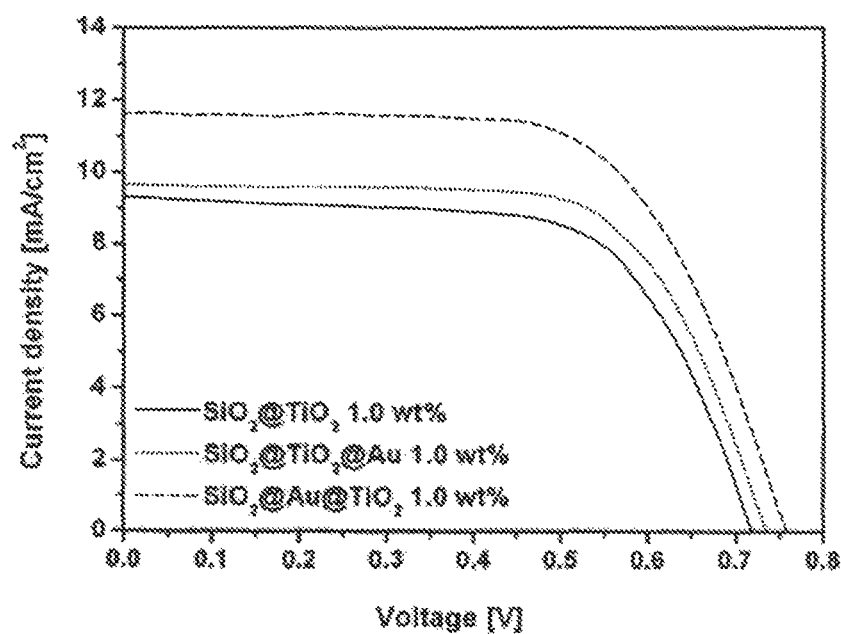
FIG. 10 is current density-voltage curves of solar cells in accordance with an example of the present disclosure.

Characteristics of the hybrid nanostructures prepared in accordance with the example of the present disclosure were analyzed by measuring UV-VIS absorption spectra (Sinco S-4100 spectrometer) and efficiencies of solar cells (AM 1.5 G illumination intensity of 100 mW/cm$^{2'}$ POLARONIX K3000 Solar Cell I-V Measurement System). FIG. 9 shows UV-VIS absorption spectra of the $SiO_2$@$TiO_2$, $SiO_2$@Au@$TiO_2$ and $SiO_2$@$TiO_2$@Au hybrid nanostructures. As compared to the $SiO_2$@$TiO_2$ hybrid nanostructure, the $SiO_2$@Au@$TiO_2$ and $SiO_2$@$TiO_2$@Au hybrid nanostructures having Au nanoparticles were found to have high absorbance in a wide wavelength range and exhibit a peak of surface plasmon resonance. Further, FIG. 10 provides measurements of a current density-voltage curve of the solar cells including the hybrid nanostructure in their photoelectrodes. Here, the current density of the solar cell having the photoelectrode including about 1.0 wt % of $SiO_2$@Au@$TiO_2$ hybrid nanostructure was found to be highest, and the current density of the solar cell including about 1.0 wt % of $SiO_2$@$TiO_2$@Au hybrid nanostructure was found be higher than the current density of the solar cell including about 1.0 wt % of $SiO_2$@$TiO_2$.

Figure 11:
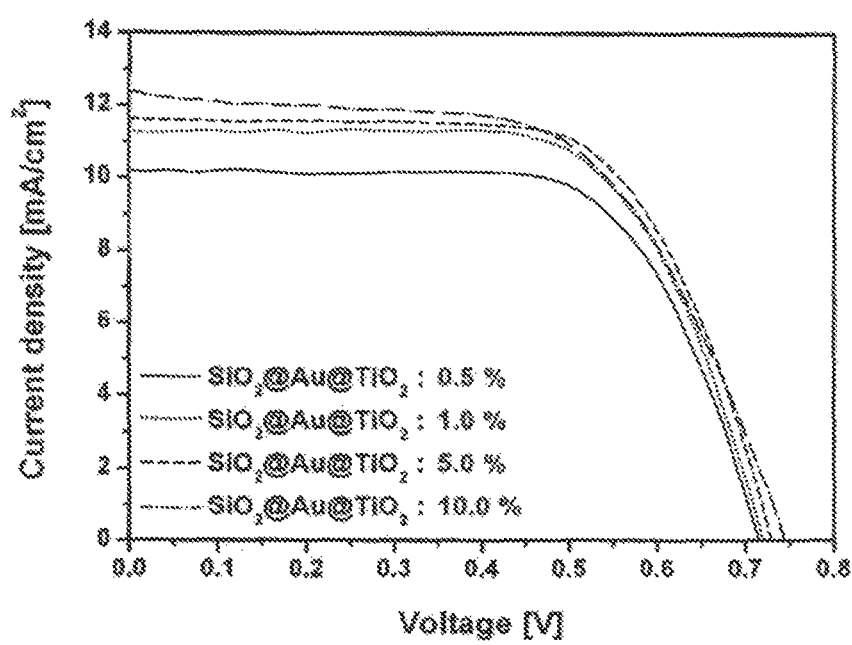
FIG. 11 is a graph and a table showing measurements of efficiency of the solar cells depending on a variation in concentration of hybrid nanostructures in accordance with an example of the present disclosure.

Analysis of Characteristics of Hybrid Nanostructure-Evaluation of Efficiency Depending on Variation of Concentration There were evaluated efficiencies of the solar cells depending on variations of concentrations of the hybrid nanostructures prepared in accordance with the example of the present disclosure. FIG. 11 provide a graph and a table showing efficiencies of photoelectrodes including $SiO_2$@Au@$TiO_2$ hybrid nanostructures at content ratios of about 0.5%, about 1.0%, about 5.0% and about 10.0%, respectively. As a result, the highest power conversion efficiency was observed when the hybrid nanostructure was added at the content ratio of about 5.0%. In comparison, when the content ratio of the $SiO_2$@Au@$TiO_2$ hybrid nanostructure was increased to about 10.0%, the efficiency of the solar cell was rather decreased, and a decrease of FF value was especially remarkable. This is deemed to be because if the content ratio of Au nanoparticles within the hybrid structure increases beyond a value, recombination of generated electrons-holes increases.

Analysis of Characteristics of Hybrid Nanostructure-Measurement of Mott-Schottky Plot In order to analyze the characteristics of the hybrid nanostructures prepared in accordance with the example of the present disclosure, open circuit voltages ($V_{oc}$) increased in the dye-sensitized solar cells including the three kinds of hybrid structures $SiO_2$@$TiO_2$, $SiO_2$@Au@$TiO_2$ and $SiO_2$@$TiO_2$@Au, respectively, were analyzed through Mott-Schottky plot measurement by which a flat band potential and a donor density of a photoelectrode can be acquired.

Figure 12:
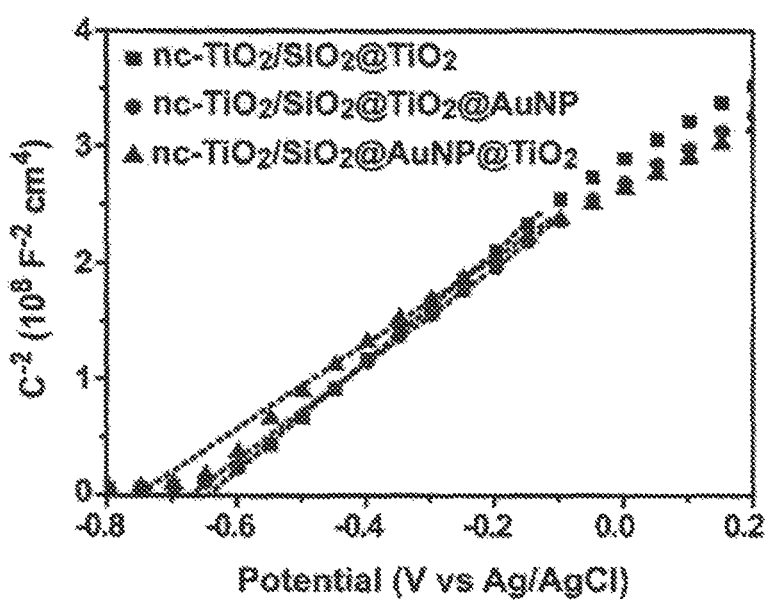
FIG. 12 is a graph and a table showing measurements of Mott-Schottky plot of dye-sensitized solar cells having the hybrid nanostructures in accordance with an example of the present disclosure.

Referring to FIG. 12 showing the result of Mott-Schottky plot measurement, an x-intercept indicating a flat band potential was found to be moved in a negative direction in the order of photoelectrodes including $SiO_2$@$TiO_2$, $SiO_2$@$TiO_2$@Au and $SiO_2$@Au@$TiO_2$. This result implies that a distance between electrolyte and the flat band potential increased in the solar cells. That is, an increase of the open circuit voltages ($V_{oc}$) of the solar cells including $SiO_2$@Au@$TiO_2$ and $SiO_2$@$TiO_2$@Au could be confirmed from the variations of the flat band potential caused by introduction of Au nanoparticles.

Analysis of Characteristics of Hybrid Nanostructure-Near-Field Effect

Figure 13A:
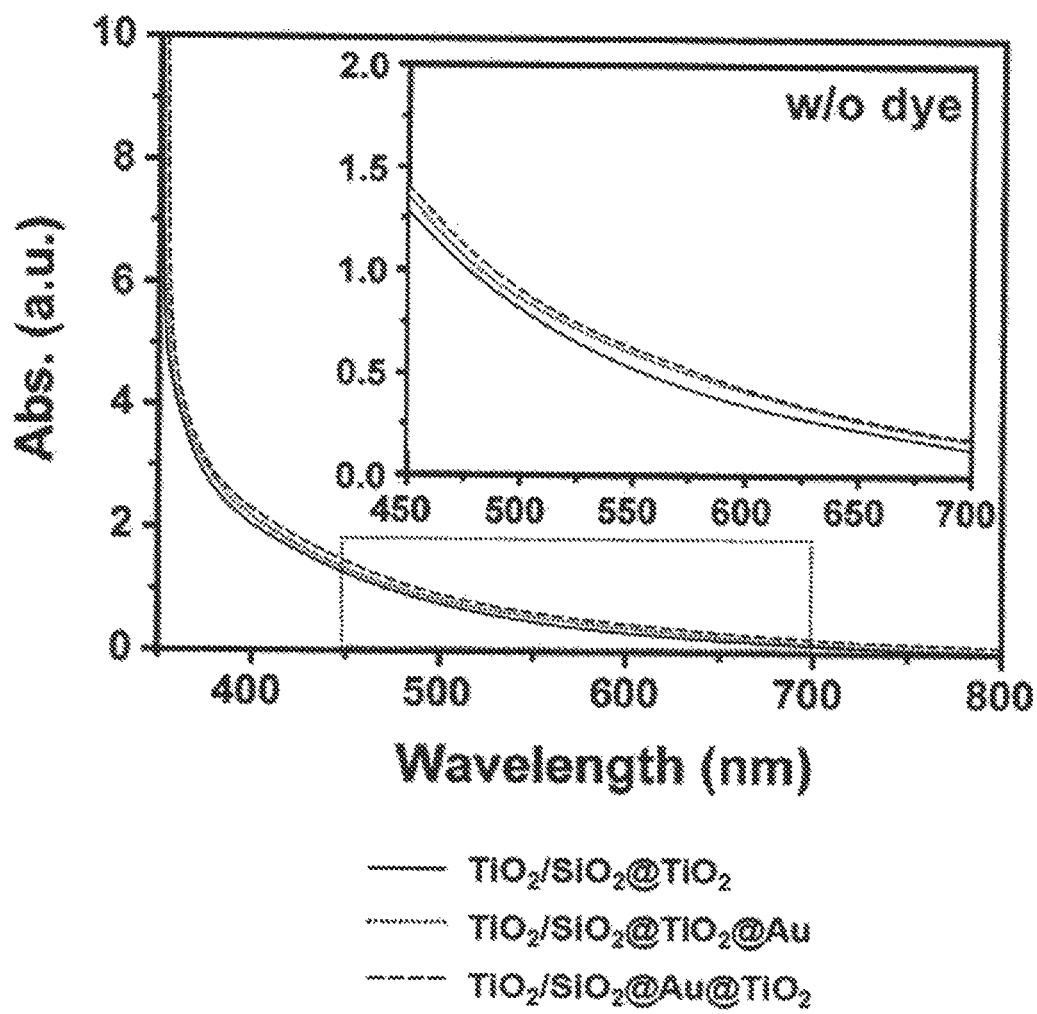
FIG. 13A is a graph showing measurements of a near-field effect in a case where a dye is not adsorbed in the photoelectrode having a hybrid nanostructure and FIG. 13B is a graph showing measurements of near-field effects in the cases where a dye is adsorbed in the photoelectrodes having the hybrid nanostructures in accordance with an example of the present disclosure.
Figure 13B:
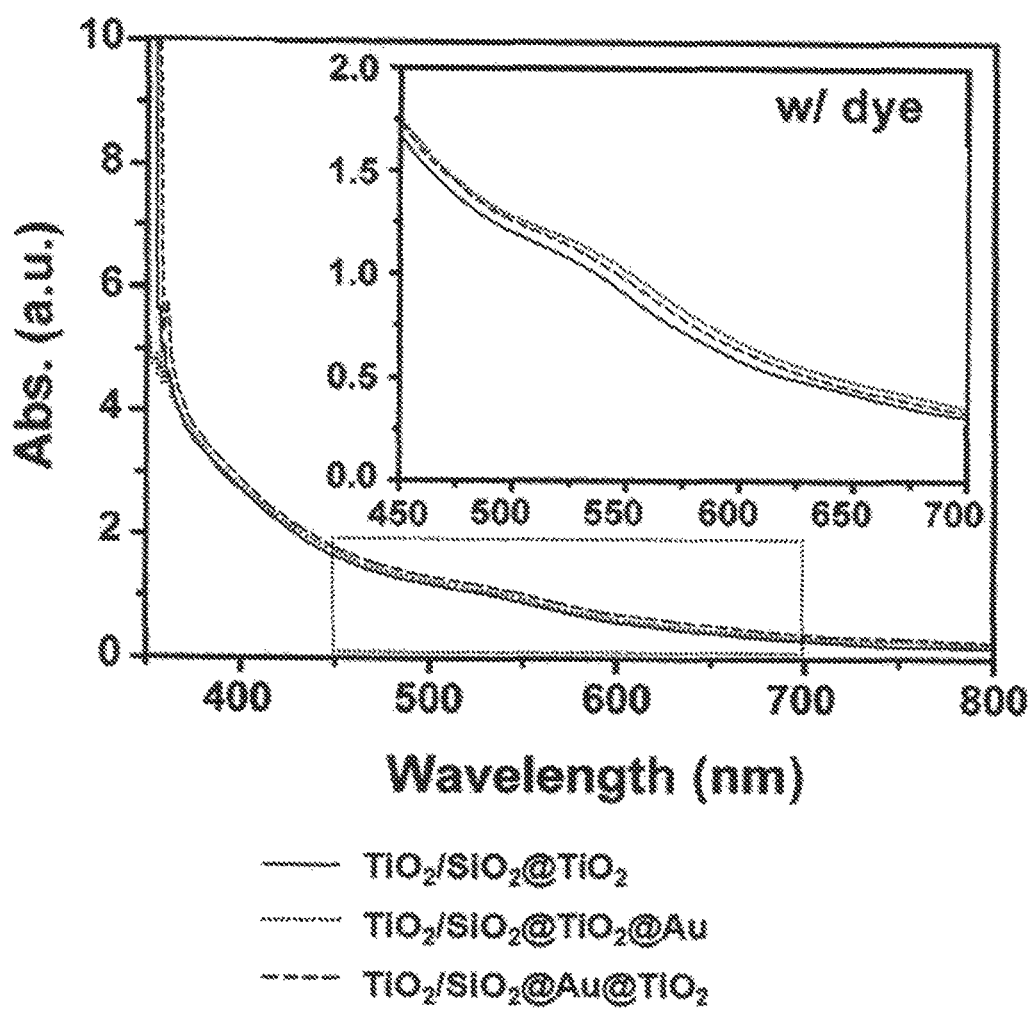

In order to investigate surface plasmon effects of the hybrid nanostructures prepared in accordance with the example of the present disclosure, there were measured ultraviolet-visible absorbance spectrums before and after a dye was adsorbed to photoelectrodes including the three kinds of hybrid nanostructures $SiO_2$@$TiO_2$, $SiO_2$@Au@$TiO_2$ and $SiO_2$@$TiO_2$@Au, respectively (FIG. 13). FIG. 13A shows absorbance graphs before the dye is adsorbed to the photoelectrodes. As can be seen from FIG. 13A, when $SiO_2$@Au@$TiO_2$ and $SiO_2$@$TiO_2$@Au were included, weak surface plasmon resonance peaks were observed near the wavelength range from about 520 nm to about 570 nm. FIG. 13B shows absorbance graphs after the dye is adsorbed to the photoelectrodes. As shown in FIG. 13B, occurrence of absorbance of the adsorbed dye was observed near the wavelength range of about 540 nm. Especially, the degree of absorbance was found to be higher in the cases of the photoelectrodes including $SiO_2$@Au@$TiO_2$ and $SiO_2$@$TiO_2$@Au containing Au nanoparticles than in the case of the photoelectrode including $SiO_2$@$TiO_2$. This result is deemed to be because absorption of the dye near the Au nanoparticles was enhanced by a field that was increased by the surface plasmon of the Au nanoparticles.

Figure 14:
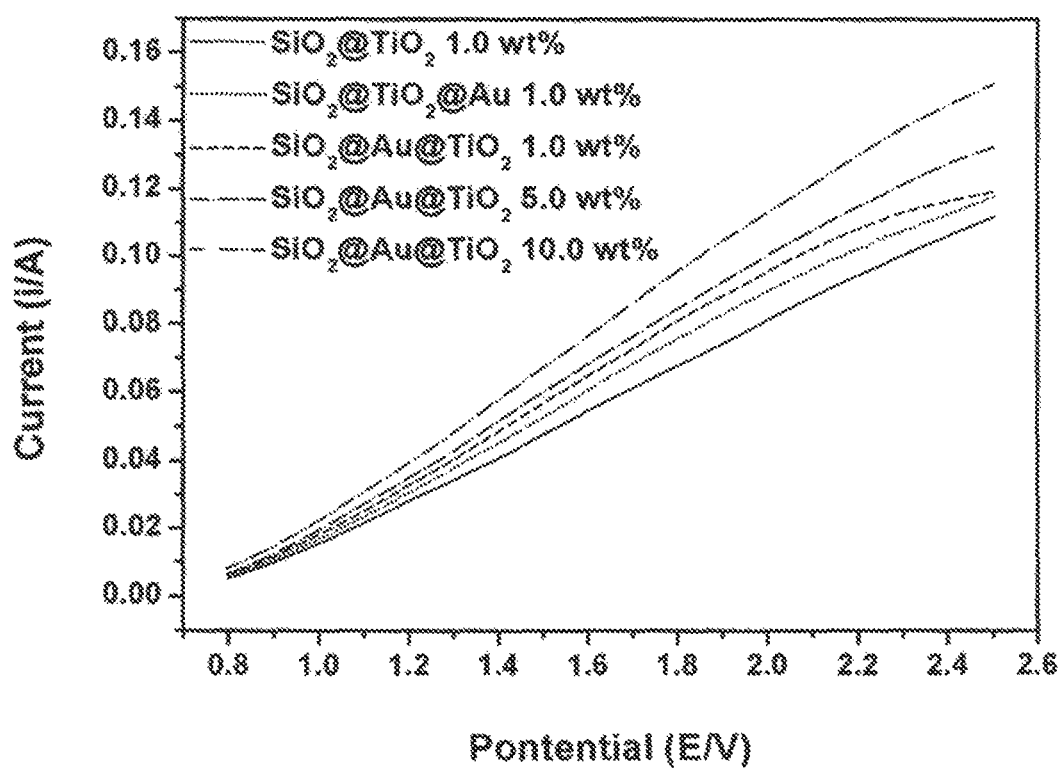
FIG. 14 is a graph showing measurements of photoelectric currents generated by the photoelectrodes having the hybrid nanostructure in accordance with an example of the present disclosure.

Analysis of Characteristics of Hybrid Nanostructure-Generation of Electrons by Surface Plasmon As for the case when the hybrid nanostructures prepared in accordance with the example of the present disclosure were included in the photoelectrodes of the dye-sensitized solar cells, in order to confirm that Au nanoparticles not only increases the absorbance efficiency of the dye due to its surface plasmon resonance phenomenon but also increases a photoelectric current by electrons excited when the Au nanoparticles resonate with incident light, it was investigated whether electrons were generated by surface plasmon. By using a photoelectrochemical cell, generation of photoelectric currents were detected without adsorbing the dye to the photoelectrodes including the three kinds of hybrid nanostructures $SiO_2$@$TiO_2$, $SiO_2$@$TiO_2$@Au and $SiO_2$@Au@$TiO_2$ (FIG. 14). At this time, the experiment was conducted by suing light in a visible range capable of exciting Au nanoparticles selectively. As a result, as shown in FIG. 14, it was confirmed that a great amount of electric current flowed in the photoelectrodes including the hybrid nanostructures containing the Au nanoparticles. Further, it was also found out that as the content ratio of the Au nanoparticles increased, the amount of the electric current also increased. That is, it was confirmed that the hot electrons excited from the Au nanoparticles contributes to the increase of the photoelectric current effectively.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A photoelectrode for a solar cell, comprising:
a $TiO_2$ particle;
a dye adsorbed on the $TiO_2$ particle; and,
hybrid nanostructures disposed on the $TiO_2$ particle,
wherein each of the hybrid nanostructures includes a $TiO_2$ shell disposed on a $SiO_2$ support particle, and Au nanoparticles,
wherein a size of the Au nanoparticles is in the range of from 5 nm to 30 nm,
wherein the hybrid nanostructures are in a sphere shape,
wherein a diameter of the hybrid nanostructures is in the range of from 100 nm to 430 nm,
wherein the hybrid nanostructures incur surface plasmon resonance, and
wherein the photoelectrode includes the hybrid nanostructures at a ratio ranging from about 0.5 weight percent to about 5.0 weight percent.

2. The photoelectrode for a solar cell of claim 1, wherein the Au nanoparticles are disposed on the $TiO_2$ shell.

3. The photoelectrode for a solar cell of claim 1, wherein the Au nanoparticles are disposed on the $SiO_2$ support particle.

4. A solar cell, comprising:
a photoelectrode of claim 1, a counter electrode, and an electrolyte.

5. A method of preparing a photoelectrode for a solar cell comprising:
preparing a paste including $TiO_2$ nanoparticles and hybrid nanostructures;
disposing a film on a conductive transparent substrate by using the paste;
heating the film on the conductive transparent substrate; and
immersing the film in a dye solution;
wherein the hybrid nanostructures are prepared by a process including steps of:
disposing amine groups on a surface of a $SiO_2$ support particle;
disposing a $TiO_2$ shell on the amine groups on the surface of the $SiO_2$ support particle;
disposing amine groups on a surface of the $TiO_2$ shell on the amine groups on the surface of the $SiO_2$ support particle; and
disposing Au nanoparticles on the amine groups on a surface of the $TiO_2$ shell on the amine groups on the surface of the $SiO_2$ support, particle;
wherein a size of the Au nanoparticles is in the range of from 5 nm to 30 nm,
wherein the hybrid nanostructures are in a sphere shape and are disposed on the $TiO_2$ nanoparticle,
wherein a diameter of the hybrid nanostructures is in the range of from 100 nm to 430 nm, and
wherein the photoelectrode includes the hybrid nanostructures at a ratio ranging from about 0.5 weight percent to about 5.0 weight percent.

6. A method of preparing a photoelectrode for a solar cell comprising:
preparing a paste including $TiO_2$ nanoparticles and hybrid nanostructures;
disposing a film on a conductive transparent substrate by using the paste;
heating, the film on the conductive transparent substrate; and
immersing the film in a dye solution;
wherein the hybrid nanostructures are prepared by a process including steps of:
disposing amine groups on a surface of a $SiO_2$ support particle;
disposing Au nanoparticles on the amine groups on the surface of the $SiO_2$ support particle;
disposing amine groups on the Au nanoparticles on the amine groups on the surface of the $SiO_2$ support particle and on the $SiO_2$ support particle; and
disposing a $TiO_2$ shell on the amine groups on the Au nanoparticles on the amine groups on the surface of the $SiO_2$ support particle and on the $SiO_2$ support particle;
wherein a size of the Au nanoparticles is in the range of from 5 nm to 30 nm,
wherein the hybrid nanostructures are in a sphere shape and are disposed on the $TiO_2$ nanoparticle,
wherein a diameter of the hybrid nanostructures is in the range from 100 nm to 430 nm, and
wherein the photoelectrode includes the hybrid nanostructures at a ratio ranging from about 0.5 weight percent to about 5.0 weight percent.

* * * * *